United States Patent [19]

Cooke et al.

[11] 3,709,310
[45] Jan. 9, 1973

[54] LOAD INDICATING APPARATUS WITH HYSTERESIS CORRECTION

[75] Inventors: Geoffrey Cyril Cooke, Stourbridge; John Anthony Gamble, Handsworth, both of England

[73] Assignee: W & T Avery Limited, Birmingham, England

[22] Filed: Aug. 17, 1970

[21] Appl. No.: 64,503

[30] Foreign Application Priority Data

Aug. 21, 1969   Great Britain.....................41,758/69

[52] U.S. Cl.................................177/168, 177/230
[51] Int. Cl. ...........................................G01g 23/14
[58] Field of Search......177/168, 169, 170, 186, 211, 177/229, 230

[56] References Cited

UNITED STATES PATENTS

| | | | |
|---|---|---|---|
| 1,622,106 | 3/1927 | Hallwood | 177/186 X |
| 1,806,741 | 5/1931 | Cameron | 177/168 X |
| 2,598,812 | 6/1952 | Marco et al. | 177/211 |
| 1,352,097 | 9/1920 | Sonander | 177/186 |
| 1,570,074 | 1/1926 | Osgood et al | 177/186 |
| 2,007,129 | 7/1935 | Lynch | 177/186 |
| 2,584,949 | 2/1952 | Weckerly | 177/186 X |
| 3,527,311 | 9/1970 | Ohaus et al | 177/168 |

Primary Examiner—Richard B. Wilkinson
Assistant Examiner—George H. Miller, Jr.
Attorney—Norris & Bateman

[57] ABSTRACT

Load indicating apparatus for weighing or testing in which errors otherwise inherent due to mechanical hysteresis are compensated by applying a hysteresis characteristic of a secondary resistant. A difference in hysteresis characteristic of like sign, e.g. positive, of two resistants may be taken in which case the resistants used may be springs or pendulums; or a sum of hysteresis characteristics of unlike sign, i.e. positive and negative, may be taken in which case one resistant may be a flexure strip and the secondary resistant with negative characteristics may be a strain gauge bonded thereto.

15 Claims, 14 Drawing Figures

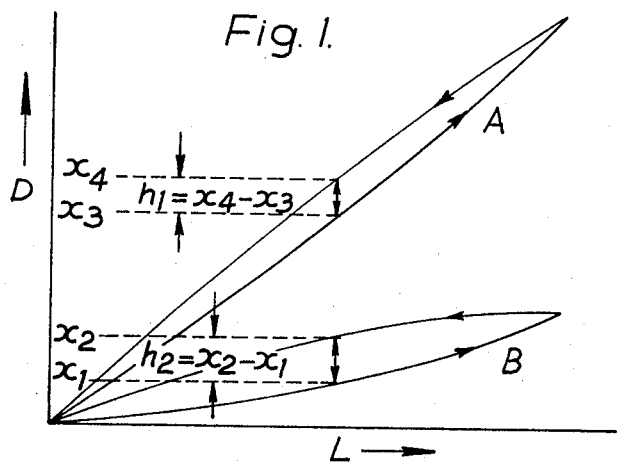
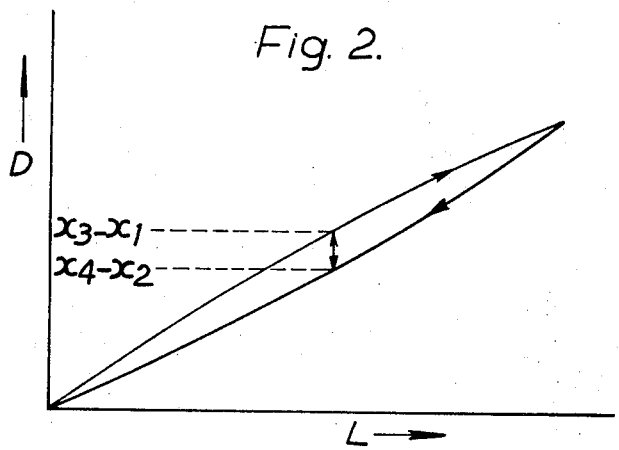
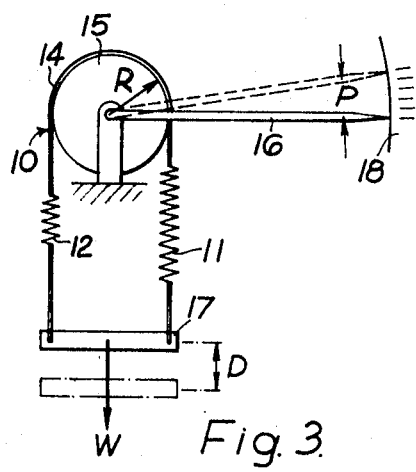
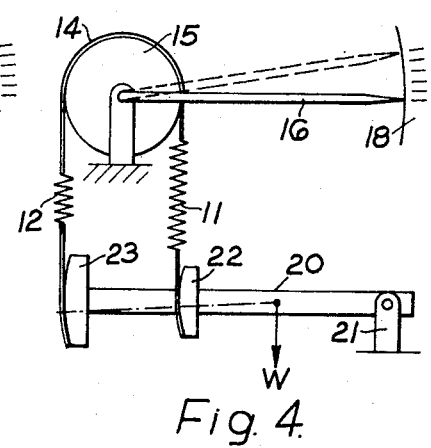

INVENTORS: GEOFFREY CYRIL COOKE
JOHN ANTHONY GAMBLE

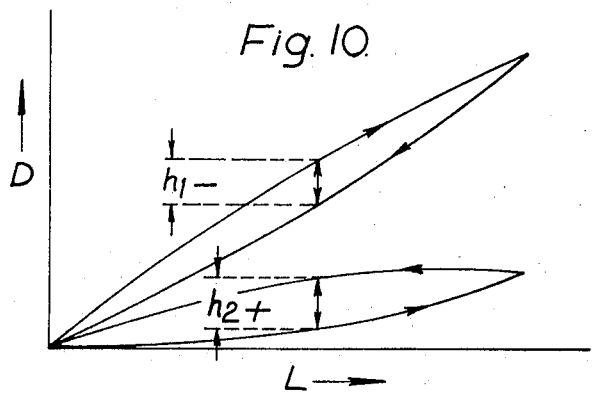
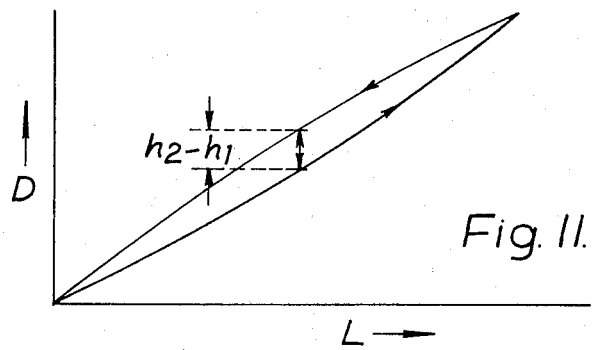
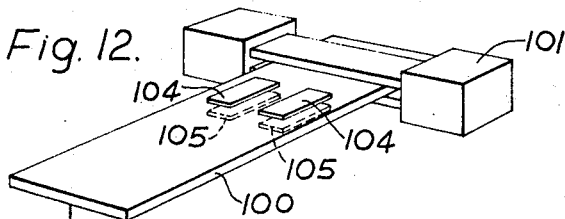
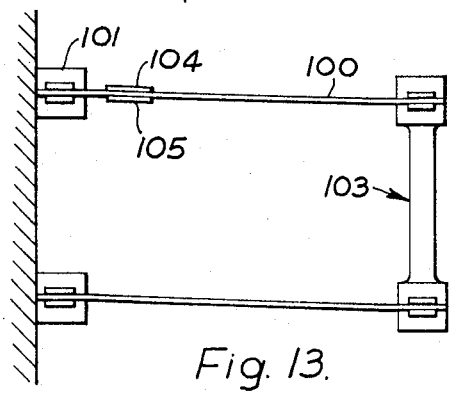
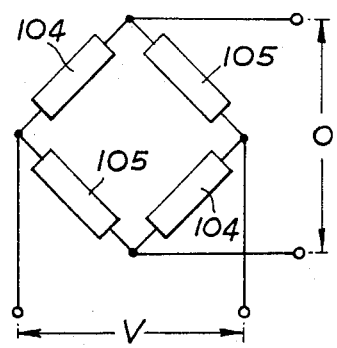
INVENTORS: GEOFFREY CYRIL COOKE
JOHN ANTHONY GAMBLE
ATTORNEYS:

LOAD INDICATING APPARATUS WITH HYSTERESIS CORRECTION

This invention relates to load indicating apparatus, particularly but not exclusively to weighing or testing machines of the self-indicating type.

It is often found that two appreciably different readings are obtained from the same value of load applied, one reading when the value is increasing and another when it is decreasing. This difference is due to mechanical hysteresis which is invariably inherent in the apparatus to some degree. The hysteresis may be positive in which the effect always lags behind the cause, i.e., a reading obtained is less for increasing loads than it is for corresponding decreasing loads; or it may be negative in which the effect leads the cause so that the greater reading is obtained from the increasing load.

The object of the invention is to provide load indicating apparatus in which errors inherent due to mechanical hysteresis are compensated.

According to the invention a load indicating apparatus having a resistant system to which a load to be measured is applied and indicating means responsive to displacement of a part of said system under load to provide a measure of magnitude of said load, is characterized in that said system comprises a primary resistant and a secondary resistant interconnected so that the load is applied to both resistants, said resistants exhibiting respective mechanical hysteresis characteristics which are mutually compensating in their effect on the indicating means.

Various preferred embodiments of the invention and certain modifications thereof are now described with reference to the accompanying drawings wherein:

FIG. 1 is a graph comparing load/deflection curves of two springs;

FIG. 2 is a graph of the difference in deflection of the two springs;

FIG. 3 is a diagram of a first embodiment of the invention;

FIG. 4 shows a modification of the apparatus shown in FIG. 3;

FIG. 10 is a graph comparing a load/deflection curve of a system having negative hysteresis with that of a system having positive hysteresis;

FIG. 11 is a graph showing the sum of the readings of FIG. 10;

FIG. 12 is a perspective view of a flexure strip and strain gauge assembly forming part of a sixth embodiment of the invention;

FIG. 13 is an elevation of a flexure linkage of the embodiment of FIG. 12; and

FIG. 14 is a diagram of the electrical connection of the strain gauges shown in FIG. 12.

Figure 5:
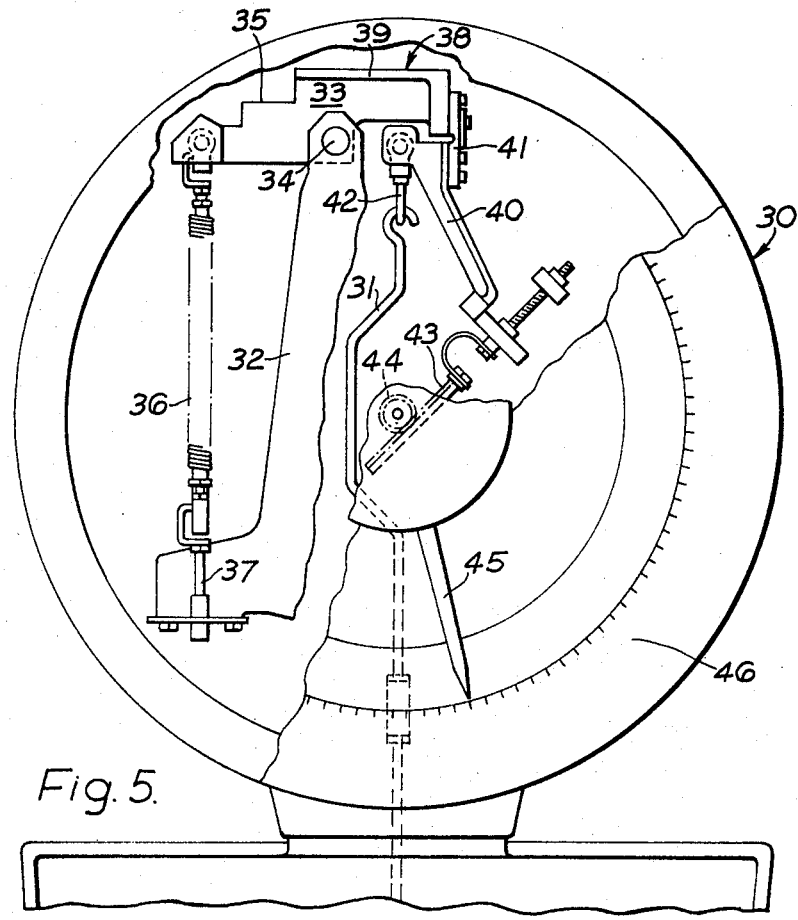
FIG. 5 is a partly broken away elevation of a dial headwork of a weighing or testing machine incorporating a second embodiment of the invention.

The graph of FIG. 1 illustrates the load/deflection curves of two springs A and B plotted against axis D representing deflection and axis L representing the load applied. Spring A is of low stiffness having positive hysteresis $h1$, and spring B is of high stiffness having positive hysteresis $h2$. The graph of FIG. 2 shows the difference in deflection of the two springs. If the absolute values of $h1$ and $h2$ be equal perfect hysteresis compensation will be achieved. In practice the two springs need not be loaded with exactly the same load nor need the difference in their extensions be exactly indicated, any non-linearity can be removed by compensating devices of known kind. The hysteresis may be naturally inherent in the spring itself, or arise from the frictional effects of its movement, or from a mechanism of which it forms part, or be a combination of any of these types of hysteresis.

FIG. 3 illustrates a first embodiment of the invention in which a resistant system 10 includes a primary resistant in the form of a first tension spring 11 having stiffness M1 connected end to end with a secondary resistant in the form of a second tension spring 12 of stiffness M2 by means of a flexible band 14 passed over a pivotally mounted drum 15 of radius R which carries an indicating pointer 16. Springs 11, 12 depend parallel to each other from opposite sides of drum 15 and their ends remote from the drum are joined to a common yoke 17 to which a load W may be applied; deflection of the yoke through distance D causing angular movement P (radians) of the pointer indicated against a scale 18. If $x_1$ and $x_2$ are the respective deflections under load W of springs 11 and 12 then:

$x_2 = D - P \cdot R$ and $x_1 = D + P \cdot R$ $x_1 - x_2 = 2 \cdot P \cdot R$ $W = (4 \cdot M2 \cdot M1 \cdot P \cdot R)/(M2 - M1)$ Thus angular movement of pointer is an indication of the difference in deflection of the springs 11 and 12 and is proportional to the applied load, and by reference back to FIGS. 1 and 2, if both springs have equal positive hysteresis $h_1$ and $h_2$ perfect hysteresis compensation will be achieved. In the more practical modification of the above embodiment shown in FIG. 4, the yoke by which the load W is applied to the resistants is in the form of a lever 20 fulcrummed at 21, spring 11 being connected thereto through arcuate cheek 22 at a point nearer the fulcrum than concentric arcuate cheek 23 to which spring 12 is connected; for it is not necessary that each spring operatively carries exactly the same load.

Referring to FIG. 5 the second embodiment of the invention is incorporated into the dial headwork 30 of a weighing or testing machine having conventional bottom lever mechanism (not shown) and to which the headwork is linked by a vertical member 31.

The headwork comprises a rigid frame 32 (shown broken away) on which is pivoted a composite first order lever 33 fulcrummed at 34. One arm 35 of the lever is rigid and is pivotally connected to a tension spring 36 anchored to the frame at 37 and serving as a primary resistant. The other arm 38 of the lever is divided into two parts, one part 39 being integral with arm 35 and the other part 40 being connected thereto by a flexure strip 41. Part 40 mounts a shackle 42, to which the vertical load applying member 31 is hooked, and has an extension carrying a conventional rack device 43 meshed with a pinion 44 of a pointer 45 whereby angular movement of lever 33 is read against graduated dial 46.

Flexure 41 serves as a secondary resistant, a downward load applied through member 31 causing both angular movement of the entire "broken beam" consisting of lever 33, to extend primary resistant spring 36; and relative displacement of the parts 39 and 40 because of bending of strip 41, the effect of the latter being to cause pointer 45 to move through a lesser angle for a given load than would otherwise be the case, the actual angular movement being proportional to the function of respective deflection of spring 36 and flexure strip 41. The effect of hysteresis in the latter is used to compensate for hysteresis of spring 36 and of the mechanism in general.

Figure 6:
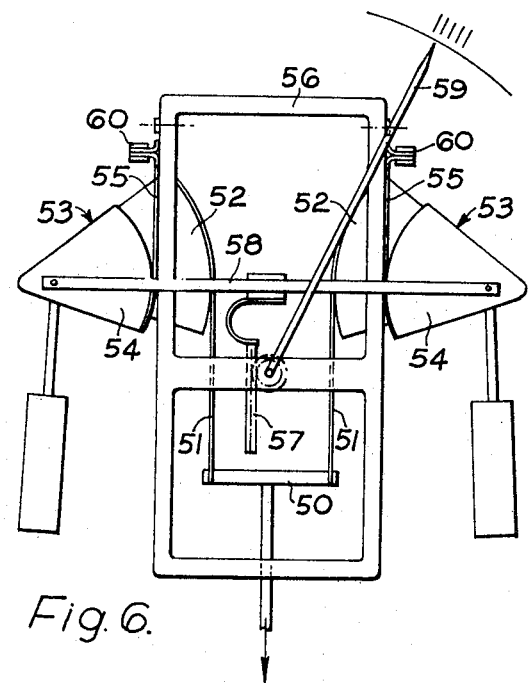
FIG. 6 is an elevation of a double pendulum mechanism incorporating a third embodiment of the invention.

Referring to FIG. 6, the third embodiment of the invention is a double pendulum mechanism in which a downward load is applied through a yoke 50 and pair of ribbons 51 to the inner sectors 52 of a pair of pendulum units 53 of a kind well known in the art. Outer sectors 54 of the units are mounted on a further pair of ribbons 55 attached at their upper ends to machine frame 56. A rack 57 is linked to a cross-member 58 across the pendulum centers and operates a conventional indicating pointer 59. Loading causes the pendulum units 53, which act as primary resistants, to rotate in opposite directions and climb up the ribbons 55 so operating pointer 59. The upper ends of the ribbons 55 are attached through a pair of bifurcated leaf springs 60 to anchorage points on frame 56, which springs form secondary resistants so that application of a load causes pointer 59 to move through a smaller angle than would otherwise be the case, and hysteresis in these springs is used to compensate hysteresis in the pendulum system. Alternatively a deliberate degree of resilience could be built into the frame 56 to provide a secondary resistant for hysteresis compensation.

Figure 7:
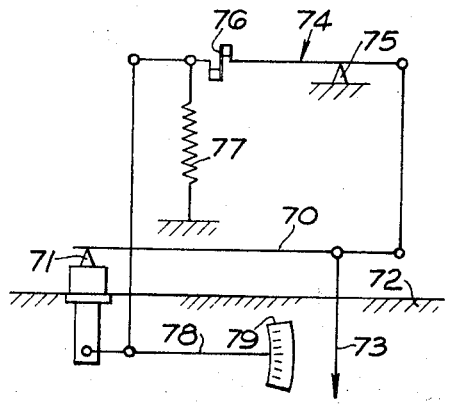
FIG. 7 is a diagram of mechanism of a self-indicating optical bench scale incorporating a fourth embodiment of the invention.

In the fourth embodiment (FIG. 7) a self-indicating optical bench scale has a primary second order lever 70 fulcrummed at 71 on a rigid base 72, a load to be measured being applied by a link 73 causing downward deflection of said lever. Lever 70 is linked in turn to one arm of secondary first order lever 74 fulcrummed at 75. The other arm of this latter lever is a "broken beam," similar to that described with reference to FIG. 5, being in two rigid parts connected by a flexure strip 76 serving as a secondary resistant. The part of this arm remote from fulcrum 75 has a tension spring 77 serving as a primary resistant attached, and is also linked to angularly movable pointer 78 which is read against scale 79. Loading of lever 70 causes deflection of the pointer 78, hysteresis in spring 77 being compensated by hysteresis in flexure 76 in the same manner as described previously.

Figure 8:
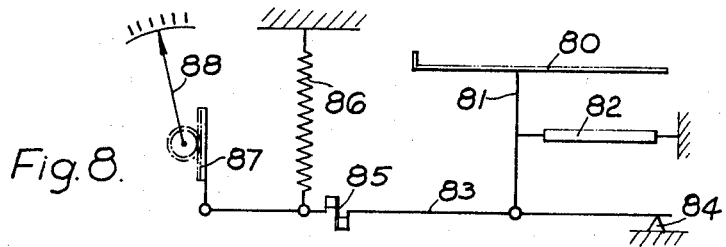
FIG. 8 is a diagram of a counter scale incorporating said fourth embodiment in a modified form.

In the modified form of this latter embodiment shown in FIG. 8 a self-indicating counter scale has a goods pan 80 mounted on a leg 81 of a Roberval linkage made up of a stay 82 parallel to part of a "broken beam" second order lever 83 fulcrummed at 84. A flexure strip 85 joins two parts of the lever arm and the part furthest from fulcrum 84 has a tension spring 86 attached to serve as primary resistant. The extreme end of lever 83 carries a rack 87 which operates a pointer 88. Again hysteresis in primary resistant spring 86 is compensated by hysteresis in secondary resistant flexure 85.

Figure 9:
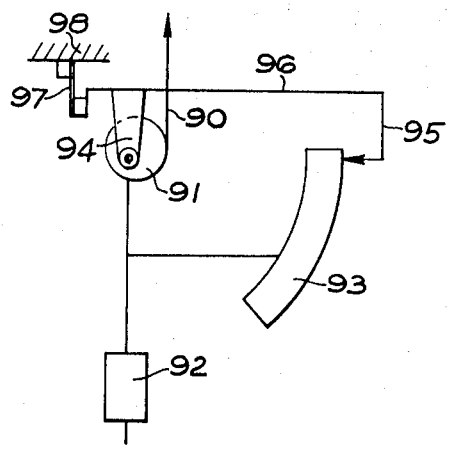
FIG. 9 is a diagram of a pendulum scale incorporating a fifth embodiment.

In the fifth embodiment (FIG. 9) another form of pendulum scale has a load to be measured applied as a vertical upwards force through a ribbon 90 to a conventional eccentrically pivoted pendulum drum 91 which carries pendulum 92 as primary resistant of the scale. Angular movement of pendulum 92 rotates a chart 93 mounted thereon whereby an indication of the load is given. Pivotal mounting 94 of the drum, and a chart reference pointer 95, are both carried on a horizontal beam 96 mounted at one end by means of a high hysteresis flexure strip 97 attached to a frame 98 of the scale. Application of the load displaces beam 96 angularly by a small degree as well as displacing pendulum 92, and the high hysteresis characteristics of the secondary resistant in the form of said beam mounting serve to compensate for hysteresis in the primary pendulum resistant system.

The embodiments described above all operate on the principle previously referred to whereby both the primary and secondary resistants have hysteresis of like sign (in these cases positive), linked together so that a difference in deflection or displacement between the two resistants is indicated.

If two resistant systems, one with positive and one with negative hysteresis are loaded together and are interconnected so that an indication of the sum of their respective deflections is given instead of the difference between them, the load can be indicated correctly free from hysteresis errors.

FIG. 10 shows load/deflection curves of two resistants one with negative and one with positive hysteresis. In FIG. 11 the sum of the two readings of FIG. 17 ($h_1$ negative and $h_2$ positive) is shown. If the resistants used have values $h_1$ and $h_2$ whose algebraic sum is zero perfect hysteresis compensation will be obtained.

This latter "sum" method of compensation is used in the sixth embodiment of the invention. A cantilever flexure strip spring 100 (FIG. 12) is held horizontally in fixed clamps 101 at one end and has a downward load to be measured applied to its opposite end, the spring forming part of a parallelogramic flexure linkage 103 shown in FIG. 13. A pair of upper strain gauges 104 are bonded by adhesive to the upper face of the spring adjacent the clamped end, i.e., at the end most highly stressed and a pair of lower strain gauges 105 are likewise bonded to the opposing lower face. Gauges 104, 105 are connected into a Wheatstone's Bridge (FIG. 14) and as is well known in the art, when a suitable excitation voltage V is applied, an electrical output 0 proportional to the applied load results.

The primary resistant of the last described apparatus, consisting of clamped flexure linkage 103, will have positive mechanical hysteresis characteristics. The bonded strain gauges 104, 105 act as a secondary resistant to which the load is also applied.

Said gauges may be of the known kind having etched foil resistances, this foil has small thickness/width ratio and is provided with anchoring parts at its ends within or on the back of the gauge which are substantial in area relative to the other dimensions of the resistances.

Tendency for the foil to creep on flexing of the gauge is therefore low and the gauge reading in itself will exhibit a low negative mechanical hysteresis.

Deflection of the spring 100 and bonded gauges sets up a shear stress within the bonding adhesive, permitting a degree of slip to occur at the interface between the spring and respective gauges. This slipping gives rise also to negative mechanical hysteresis. By choice of an adhesive having a predetermined shear strength a desired degree of negative hysteresis is built into the said secondary resistant assembly to be automatically balanced against the positive hysteresis of the primary resistant assembly to provide an indicated load reading substantially free from hysteresis error.

Alternatively gauges 104, 105 are of the known kind having wire resistances. The wire used has high thickness/width ratio compared with foil, and also has a less relative area for anchorage so that the tendency for the wire to creep on flexure of the gauge is much higher and said gauges in themselves give high negative mechanical hysteresis. Even if an adhesive having a low hysteresis value is used for bonding the amount of negative hysteresis of the entire secondary resistant assembly may exceed the positive hysteresis value of flexure linkage 103. Hysteresis balance is achieved in this case by increasing the effective clamping area of clamps 101 on the flexure strips, for the positive hysteresis value of said assembly is in direct proportion to the measure of said area, the clamping force exerted remaining constant.

Thus by choice of type of bonding adhesive and/or selection of appropriate clamping dimensions the desired hysteresis compensation is obtained.

We claim:

1. A load indicating apparatus having a resistant system to which a load to be measured is applied and indicating means responsive to displacement of a part of said system under load to provide a measure of magnitude of said load, characterized in that said system comprises a primary resistant and a secondary resistant interconnected so that the load is applied to both resistants, said resistants exhibiting respective mechanical hysteresis characteristics which are mutually compensating in their effect on the indicating means.

2. An apparatus according to claim 1 characterized in that the hysteresis characteristic of the primary resistant is opposite in sign to the hysteresis characteristic of the secondary resistant and said resistants are interconnected so that the algebraic sum of the values of said characteristics forms part of the indicated measure of magnitude of the load.

3. An apparatus according to claim 2 characterized in that the primary resistant includes at least one cantilever flexure spring mounted by clamping means, the hysteresis characteristic of said resistant being positive, and in that the value of said positive hysteresis characteristic is predetermined by the effective clamping area of the clamping means acting on the flexure spring.

4. An apparatus according to claim 3 characterized in that the secondary resistant includes at least one strain gauge bonded by an adhesive to a face of the flexure spring and forming a sensor responsive to displacement of the spring under load to provide the measure thereof, the hysteresis characteristic of said secondary resistant being negative.

5. An apparatus according to claim 4 characterized in that the value of said negative hysteresis characteristic is predetermined by the shear strength of the bonding adhesive.

6. An apparatus according to claim 1 characterized in that the respective hysteresis characteristics of said two resistants are of the same sign and said resistants are interconnected so that a difference in magnitude of their respective displacements forms the indicated measure of magnitude of the load.

7. An apparatus according to claim 6 characterized in that at least one resistant includes a pendulum.

8. An apparatus according to claim 7 characterized in that said one resistant is the primary resistant and the secondary resistant includes a spring.

9. An apparatus according to claim 8 characterized in that the spring carries a mounting on which the pendulum is supported for angular movement under load relative to the mounting.

10. An apparatus according to claim 6 characterized in that both said hysteresis characteristics are positive in sign.

11. An apparatus according to claim 10 characterized in that at least one resistant includes a helical tension spring.

12. An apparatus according to claim 11 characterized in that said one resistant is the primary resistant and the secondary resistant also includes a helical tension spring.

13. An apparatus according to claim 12 characterized in that the helical tension springs are linked end to end by a flexible band passed round a drum, angular movement of the drum under loading of the springs providing the measure of quantity of the load.

14. An apparatus according to claim 11 characterized in that said one resistant is the primary resistant and the secondary resistant is a flexure strip.

15. An apparatus according to claim 14 characterized in that said flexure strip connects two parts of a lever through which the load is applied to the primary resistant spring.

* * * * *